United States Patent [19]
Keppeler et al.

[11] Patent Number: 5,981,612
[45] Date of Patent: Nov. 9, 1999

[54] PRODUCTION OF FLAMEPROOFED, RIGID, ISOCYANATE-BASED FOAMS

[75] Inventors: Uwe Keppeler, Hochdorf-Assenheim; Werner Hinz, Frankenthal; Michael Reichelt, Ruhland, all of Germany

[73] Assignee: BASF Aktiengesellschaft, Ludwigshafen, Germany

[21] Appl. No.: 08/967,188

[22] Filed: Oct. 29, 1997

Related U.S. Application Data

[63] Continuation of application No. 08/539,256, Oct. 5, 1995, abandoned.

Foreign Application Priority Data

Dec. 27, 1994 [DE] Germany ............... 44 46 847

[51] Int. Cl.$^6$ ............... C08J 9/04; C08K 3/28; C08K 3/32; C08K 5/51
[52] U.S. Cl. ............ 521/107; 521/106; 521/108; 521/128; 521/129; 521/163; 521/164; 521/165; 521/168; 521/169; 521/170; 521/906
[58] Field of Search .................. 521/107, 108, 521/128, 129, 163, 164, 165, 168, 169, 170, 906, 106

[56] References Cited

U.S. PATENT DOCUMENTS

| | | | |
|---|---|---|---|
| 3,294,710 | 12/1966 | Rosenberg et al. | 521/169 |
| 3,423,343 | 1/1969 | Barnett et al. | 521/165 |
| 3,509,076 | 4/1970 | Anderson | 521/108 |
| 3,943,077 | 3/1976 | Bell et al. | 521/165 |
| 4,129,693 | 12/1978 | Cenker et al. | 521/106 |
| 4,224,374 | 9/1980 | Priest | 428/310 |
| 4,774,268 | 9/1988 | Marx et al. | 523/179 |
| 4,780,484 | 10/1988 | Schubert et al. | 521/106 |
| 4,960,803 | 10/1990 | Muhl et al. | 521/106 |
| 5,086,082 | 2/1992 | Stone | 521/906 |
| 5,171,758 | 12/1992 | Natoli et al. | 521/906 |
| 5,173,515 | 12/1992 | von Bonin et al. | 521/103 |
| 5,177,118 | 1/1993 | Dueber et al. | 521/159 |
| 5,229,427 | 7/1993 | Madaj | 521/906 |
| 5,393,569 | 2/1995 | Yao et al. | 521/906 |

FOREIGN PATENT DOCUMENTS

| | | |
|---|---|---|
| 0 158 165 A1 | 10/1985 | European Pat. Off. . |
| 0 255 381 A3 | 2/1988 | European Pat. Off. . |
| 1388667 | 6/1965 | France . |

*Primary Examiner*—Rabon Sergent
*Attorney, Agent, or Firm*—Fernando A. Borrego

[57] ABSTRACT

The flameproofed, rigid, isocyanate-based foams, in particular rigid polyurethane and polyisocyanurate foams, are produced by reacting a) organic and/or modified organic polyisocyanates with
b) at least one relatively high-molecular-weight compound containing at least two reactive hydrogen atoms, and, if desired,
c) low-molecular-weight chain extenders and/or crosslinking agents, in the presence of
d) blowing agents,
e) catalysts,
f) flameproofing agents, and, if desired,
g) further auxiliaries and/or additives, wherein the flameproofing agent is a combination of at least one liquid flameproofing agent which is reactive toward isocyanates and at least one solid flameproofing agent.

16 Claims, No Drawings

PRODUCTION OF FLAMEPROOFED, RIGID, ISOCYANATE-BASED FOAMS

This is a continuation of application Ser. No. 08/539,256 filed Oct. 5, 1995 now abandoned.

The present invention relates to a process for the production of flameproofed, rigid, isocyanate-based foams, in particular rigid polyurethane and polyisocyanurate foams, by reacting a) organic and/or modified organic polyisocyanates with b) at least one relatively high-molecular-weight compound containing at least two reactive hydrogen atoms, and, if desired, c) low-molecular-weight chain extenders and/or crosslinking agents, in the presence of d) blowing agents, e) catalysts, f) a specific flameproofing agent combination, and, if desired, g) further auxiliaries and/or additives.

Flameproofed, rigid, isocyanate-based foams, in particular rigid polyurethane and polyisocyanurate foams, have been known for some time and are used predominantly in the construction industry for insulation purposes. Halogen-free formulations for flameproofed, rigid, isocyanate-based foams are disclosed in DE-A-4003718, DE-A-4109076, DE-A-4222519 and EP-B-0463493. The flameproofing agents in these formulations are phosphoric acid esters, for example diphenyl cresyl phosphate and triethyl phosphate, or phosphonic acid esters, for example diethyl ethylphosphonate and dimethyl methylphosphonate, in relatively large amounts. These flameproofing agents have an adverse effect on the mechanical strength and aging behavior. Halogen-free formulations of flameproofed, rigid, isocyanate-based foams are also described in DE-A-4020283, where the flameproofing agent is red phosphorus. Red phosphorus has a tendency toward ignition, in particular when heat of friction arises in mechanically moved parts, as, for example, in polyurethane processing plants. There are therefore safety doubts about the use of red phosphorus.

It is an object of the present invention to provide flameproofed, rigid, isocyanate-based foams containing halogen-free flameproofing agent, in which the disadvantages of the prior art are substantially avoided and mechanical and physical properties are not adversely affected and which do not have impaired fire behavior.

We have found that this object is achieved by flameproofing rigid, isocyanate-based foams using a combination of liquid flameproofing agents which are reactive toward isocyanates and solid flameproofing agents.

The present invention accordingly provides a process for the production of flameproofed, rigid, isocyanate-based foams, in particular rigid polyurethane and polyisocyanurate foams, by reacting a) organic and/or modified organic polyisocyanates with b) at least one relatively high-molecular-weight compound containing at least two reactive hydrogen atoms, and, if desired, c) low-molecular-weight chain extenders and/or crosslinking agents, in the presence of d) blowing agents, e) catalysts, f) flameproofing agents, and, if desired, g) further auxiliaries and/or additives, wherein the flameproofing agent is a combination of at least one liquid flameproofing agent which is reactive toward isocyanates and at least one solid flameproofing agent.

It was surprising and in no way foreseeable that the use of this novel flameproofing agent combination, in particular in the presence of readily flammable aliphatic and cycloaliphatic blowing agents, would allow the production of rigid, isocyanate-based foams which have the fire behavior desired for use in the construction industry, without any adverse effects on the mechanical and important processing and applicational properties of the foams. The foams are halogen-free; unreactive, liquid flameproofing agents, as usually used, are not required or can be used in very small amounts.

In principle, the novel flameproofing can be used for all rigid, isocyanate-based foams known per se which can be produced by processes conventional per se. Particularly advantageous results are achieved with rigid polyurethane and isocyanurate foams.

The rigid, isocyanate-based foams are produced by the novel process using, with the exception of the flameproofing agents (f), formative components which are known per se, to which the following details apply.

a) Suitable organic and/or modified organic polyisocyanates (a) are the aliphatic, cycloaliphatic, araliphatic and preferably aromatic polyisocyanates known per se.

The following may be mentioned as examples: alkylene diisocyanates having from 4 to 12 carbon atoms in the alkylene moiety, such as 1,12-dodecane diisocyanate, 2-ethyltetramethylene 1,4-diisocyanate, 2-methylpentamethylene 1,5-diisocyanate, tetramethylene 1,4-diisocyanate and preferably hexamethylene 1,6-diisocyanate; cycloaliphatic diisocyanates, such as cyclohexane 1,3- and 1,4-diisocyanate and any desired mixtures of these isomers, 1-isocyanato-3,3,5-trimethyl-5-isocyanatomethylcyclohexane(isophorone diisocyanate), 2,4- and 2,6-hexahydrotolylene diisocyanate, and the corresponding isomer mixtures, 4,4'-, 2,2'- and 2,4'-dicyclohexylmethane diisocyanate and the corresponding isomer mixtures, and preferably aromatic diisocyanates and polyisocyanates, eg. 2,4- and 2,6-tolylene diisocyanate and the corresponding isomer mixtures, 4,4'-, 2,4'- and 2,2'-diphenylmethane diisocyanate and the corresponding isomer mixtures, mixtures of 4,4'- and 2,4'-diphenylmethane diisocyanates, polyphenyl-polymethylene polyisocyanates, mixtures of 4,4'-, 2,4'- and 2,2'-diphenylmethane diisocyanates and polyphenyl-polymethylene polyisocyanates (crude MDI), and mixtures of crude MDI and tolylene diisocyanates. The organic diisocyanates and polyisocyanates may be employed individually or in the form of mixtures.

Frequently, modified polyisocyanates are also used, ie. products which are obtained by chemical reaction of organic diisocyanates and/or polyisocyanates. Specific examples are ester-, urea-, biuret-, allophanate-, carbodiimide-, isocyanurate-, uretdione- and/or urethane-containing diisocyanates and/or polyisocyanates. Individual examples are urethane-containing organic, preferably aromatic, polyisocyanates containing from 33.6 to 15% by weight, preferably from 31 to 21% by weight, of NCO, based on the total weight, for example 4,4'-diphenylmethane diisocyanate, 4,4'- and 2,4'-diphenylmethane diisocyanate mixtures, or crude MDI or 2,4- or 2,6-tolylene diisocyanate, in each case modified by means of low-molecular-weight diols, triols, dialkylene glycols, trialkylene glycols or polyoxyalkylene glycols having molecular weights of up to 6000, in particular up to 1500, specific examples of di- and polyoxyalkylene glycols, which can be employed individually or as mixtures, being diethylene, dipropylene, polyoxyethylene, polyoxypropylene and polyoxypropylene-polyoxyethylene glycols, triols and/or tetrols. NCO-containing prepolymers containing from 25 to 3.5% by weight, preferably from 21 to 14% by weight, of NCO, based on the total weight, and prepared from the polyester- and/or preferably polyether-polyols described below and 4,4'-diphenylmethane diisocyanate, mixtures of 2,4'- and 4,4'-diphenylmethane diisocyanate, 2,4- and/or 2,6-tolylene diisocyanates or crude MDI are also suitable. Furthermore, liquid polyisocyanates containing carbodiimide groups and/or isocyanurate rings and containing from 33.6 to 15% by weight, preferably from 31 to 21% by weight, of NCO, based on the total weight, eg. based on 4,4'-, 2,4'- and/or 2,2'-diphenylmethane diisocyanate and/or 2,4- and/or 2,6-tolylene diisocyanate, have also proven successful.

The modified polyisocyanates can, if desired, be mixed with one another or with unmodified organic polyisocyanates, eg. 2,4'- or 4,4'-diphenylmethane diisocyanate, crude MDI or 2,4- and and/or 2,6-tolylene diisocyanate.

Particularly successful isocyanates are diphenylmethane diisocyanate isomer mixtures or crude MDI, in particular crude MDI having a diphenylmethane diisocyanate isomer content of from 33 to 55% by weight, and urethane group-containing polyisocyanate mixtures based on diphenylmethane diisocyanate having an NCO content of from 15 to 33% by weight.

b) The relatively high-molecular-weight compounds (b) containing at least two reactive hydrogen atoms are compounds carrying two or more reactive groups selected from OH groups, SH groups, NH groups, $NH_2$ groups and CH-acidic groups in the molecule.

The other relatively high-molecular-weight compounds b) containing at least two reactive hydrogen atoms are expediently those having a functionality of from 2 to 8, preferably 3 to 8, and a mean molecular weight of from 400 to 8000, preferably from 400 to 2000. Success has been achieved using, for example, polyether polyamines and/or preferably polyols selected from the group consisting of the polyether-polyols, polyester-polyols, polythioether-polyols, polyester-amides, hydroxyl-containing polyacetals and hydroxyl-containing aliphatic polycarbonates, or mixtures of at least two of said polyols. Preference is given to polyester-polyols and/or polyether-polyols. The hydroxyl number of the polyhydroxyl compounds is generally from 150 to 850, preferably from 200 to 600.

Suitable polyester-polyols may be prepared, for example, from organic dicarboxylic acids having from 2 to 12 carbon atoms, preferably aliphatic dicarboxylic acids having from 4 to 6 carbon atoms and polyhydric alcohols, preferably diols, having from 2 to 12 carbon atoms, preferably from 2 to 6 carbon atoms. Examples of suitable dicarboxylic acids are succinic acid, glutaric acid, adipic acid, suberic acid, azelaic acid, sebacic acid, decanedicarboxylic acid, maleic acid, fumaric acid, phthalic acid, isophthalic acid and terephthalic acid. The dicarboxylic acids may be used either individually or mixed with one another. It is also possible to replace the free dicarboxylic acids by the corresponding dicarboxylic acid derivatives, for example dicarboxylic esters of alcohols having from 1 to 4 carbon atoms or dicarboxylic anhydrides. Preference is given to dicarboxylic acid mixtures comprising succinic acid, glutaric acid and adipic acid in ratios of, for example, from 20 to 35:35 to 50:20 to 32 parts by weight, and in particular adipic acid. Examples of dihydric and polyhydric alcohols, in particular diols, are ethanediol, diethylene glycol, 1,2- and 1,3-propanediol, dipropylene glycol, 1,4-butanediol, 1,5-pentanediol, 1,6-hexanediol, 1,10-decanediol, glycerol, trimethylolpropane. Preference is given to ethanediol, diethylene glycol, 1,4-butanediol, 1,5-pentanediol, 1,6-hexanediol or mixtures of at least two of said diols, in particular mixtures of 1,4-butanediol, 1,5-pentanediol and 1,6-hexanediol. Furthermore, polyester-polyols made from lactones, eg. ε-caprolactone or hydroxy-carboxylic acids, eg. ω-hydroxycaproic acid, may also be employed.

The polyester-polyols can be prepared by polycondensing the organic, eg. aromatic and preferably aliphatic polycarboxylic acids and/or derivatives thereof and polyhydric alcohols without using a catalyst or preferably in the presence of an esterification catalyst, expediently in an inert gas atmosphere, eg. nitrogen, carbon monoxide, helium, argon, inter alia, in the melt at from 150 to 250° C., preferably from 180 to 220° C., at atmospheric pressure or under reduced pressure until the desired acid number, which is advantageously less than 10, preferably less than 2, is reached. In a preferred embodiment, the esterification mixture is polycondensed at the abovementioned temperatures under atmospheric pressure and subsequently under a pressure of less than 500 mbar, preferably from 50 to 150 mbar, until an acid number of from 80 to 30, preferably from 40 to 30, has been reached. Examples of suitable esterification catalysts are iron, cadmium, cobalt, lead, zinc, antimony, magnesium, titanium and tin catalysts in the form of metals, metal oxides or metal salts. However, the polycondensation may also be carried out in the liquid phase in the presence of diluents and/or entrainers, eg. benzene, toluene, xylene or chlorobenzene, for removal of the water of condensation by azeotropic distillation.

The polyester-polyols are advantageously prepared by polycondensing the organic polycarboxylic acids and/or derivatives thereof with polyhydric alcohols in a molar ratio of from 1:1 to 1.8, preferably from 1:1.05 to 1.2.

The polyester-polyols obtained preferably have a functionality of from 2 to 4, in particular from 2 to 3, and a molecular weight of from 150 to 3000, preferably from 150 to 2000.

However, the polyols used are in particular polyether-polyols prepared by known processes, for example by anionic polymerization using alkali metal hydroxides such as sodium hydroxide or potassium hydroxide, or alkali metal alkoxides, such as sodium methoxide, sodium ethoxide, potassium ethoxide or potassium isopropoxide as catalysts and with addition of at least one initiator molecule containing from 2 to 8, preferably 2 to 6, reactive hydrogen atoms in bound form or by cationic polymerization using Lewis acids, such as antimony pentachloride, boron fluoride etherate, inter alia, or bleaching earth as catalysts, from one or more alkylene oxides having from 2 to 4 carbon atoms in the alkylene moiety.

Examples of suitable alkylene oxides are tetrahydrofuran, 1,3-propylene oxide, 1,2- and 2,3-butylene oxide, styrene oxide and preferably ethylene oxide and 1,2-propylene oxide. The alkylene oxides may be used individually, alternately one after the other or as mixtures. Examples of suitable initiator molecules are water, organic dicarboxylic acids, such as succinic acid, adipic acid, phthalic acid and terephthalic acid, aliphatic and aromatic, unsubstituted or N-mono-, N,N- and N,N'-dialkyl-substituted diamines having from 1 to 4 carbon atoms in the alkyl moiety, such as unsubstituted or mono- or dialkyl-substituted ethylenediamine, diethylenetriamine, triethylenetetramine, 1,3-propylenediamine, 1,3- and 1,4-butylenediamine, 1,2-, 1,3-, 1,4-, 1,5- and 1,6-hexamethylenediamine, phenylenediamines, 2,3-, 2,4- and 2,6-tolylenediamine and 4,4'-, 2,4'- and 2,2'-diaminodiphenylmethane.

Other suitable initiator molecules are alkanolamines, eg. ethanolamine, N-methyl- and N-ethylethanolamine, dialkanolamines, eg. diethanolamine, N-methyl- and N-ethyldiethanolamine, and trialkanolamines, eg. triethanolamine, and ammonia. Preference is given to polyhydric alcohols, in particular dihydric and/or trihydric alcohols, such as ethanediol, 1,2- and 1,3-propanediol, diethylene glycol, dipropylene glycol, 1,4-butanediol, 1,6-hexanediol, glycerol, trimethylolpropane, pentaerythritol, sorbitol and sucrose.

The polyether-polyols, preferably polyoxypropylene- and polyoxypropylene-polyoxyethylene-polyols, preferably have a functionality of from 2 to 6, in particular 2 to 4, and molecular weights of from 400 to 8000, preferably from 1200 to 6000, in particular from 1800 to 4000 and suitable polyoxytetramethylene glycols have a molecular weight of approximately 3500.

Other suitable polyether-polyols are polymer-modified polyether-polyols, preferably graft polyether-polyols, in particular those based on styrene and/or acrylonitrile and prepared by in situ polymerization of acrylonitrile, styrene or preferably mixtures of styrene and acrylonitrile, for example in a weight ratio of from 90:10 to 10:90, preferably from 70:30 to 30:70, expediently in the abovementioned polyether-polyols by a method similar to that of German Patents 11 11 394, 12 22 669 (U.S. Pat. Nos. 3,304,273, 3,383,351 and 3,523,093), 11 52 536 (GB 1,040,452) and 11 52 537 (GB 987,618), and polyether-polyol dispersions which contain, as the disperse phase, usually in an amount of from 1 to 50% by weight, preferably from 2 to 25% by weight, for example polyureas, polyhydrazides, polyurethanes containing tertiary amino groups in bonded form, and/or melamine and are described, for example, in EP-B-011 752 (U.S. Pat. No. 4,304,708), U.S. Pat. No. -4,374,209 and DE-A-32 31 497.

Like the polyester-polyols, the polyether-polyols can be used individually or in the form of mixtures. Furthermore, they may be mixed with the graft polyether-polyols or polyester-polyols and the hydroxyl-containing polyesteramides, polyacetals, polycarbonates and/or polyetherpolyamines.

Examples of suitable hydroxyl-containing polyacetals are the compounds which can be prepared from glycols, such as diethylene glycol, triethylene glycol, 4,4'-dihydroxyethoxydiphenyldimethylmethane, hexanediol and formaldehyde. Suitable polyacetals can also be prepared by polymerizing cyclic acetals.

Suitable hydroxyl-containing polycarbonates are those of a conventional type, which can be prepared, for example, by reacting diols, such as 1,3-propanediol, 1,4-butanediol and/or 1,6-hexanediol, diethylene glycol, triethylene glycol or tetraethylene glycol, with diaryl carbonates, eg. diphenyl carbonate, or phosgene.

The polyester-amides include, for example, the predominantly linear condensates obtained from polybasic, saturated and/or unsaturated carboxylic acids or anhydrides thereof and polyhydric, saturated and/or unsaturated amino alcohols, or mixtures of polyhydric alcohols and amino alcohols and/or polyamines.

Suitable polyether-polyamines can be prepared from the abovementioned polyether-polyols by known processes. Preparation processes which may be mentioned are the cyanoalkylation of polyoxyalkylene-polyols followed by hydrogenation of the resultant nitrile (U.S. Pat. No. 3,267,050) and the partial or full amination of polyoxyalkylene-polyols using amines or ammonia in the presence of hydrogen and catalysts (DE 12 15 373).

It is furthermore possible to use polyols in which at least some of the hydroxyl groups have been replaced by CH-acidic groups.

c) The rigid, isocyanate-based foams can be produced with or without the use of chain extenders and/or crosslinking agents (c). However, it may prove advantageous, in order to modify the mechanical properties, for example the rigidity, to add chain extenders, crosslinking agents or, if desired, mixtures thereof. Examples of chain extenders and/or crosslinking agents are diols and/or triols having molecular weights of less than 400, preferably from 60 to 300. Examples are aliphatic, cycloaliphatic and/or araliphatic diols having from 2 to 14 carbon atoms, preferably from 4 to 10 carbon atoms, eg. ethylene glycol, 1,3-propanediol, 1,10-decanediol, o-, m- and p-dihydroxycyclohexane, diethylene glycol, dipropylene glycol and preferably 1,4-butanediol, 1,6-hexanediol and bis(2-hydroxyethyl)hydroquinone, triols such as 1,2,4- and 1,3,5-trihydroxycyclohexane, glycerol and trimethylolpropane, and low-molecular-weight hydroxyl-containing polyalkylene oxides based on ethylene oxide and/or 1,2-propylene oxide, and the abovementioned diols and/or triols as initiator molecules.

Any chain extenders, crosslinking agents or mixtures thereof used for the production of the rigid polyurethane foams are expediently used in an amount of from 0 to 20% by weight, preferably from 2 to 8% by weight, based on the weight of the relatively high-molecular-weight compound (b).

d) The blowing agents (d) which can be employed for the production of the rigid foams include, for example, water, which reacts with isocyanate groups to form carbon dioxide and/or physical blowing agents. Suitable physical blowing agents are liquids which are inert toward the organic, modified or unmodified polyisocyanates and which have boiling points of below 100° C., preferably below 50° C., in particular from −50° C. to 30° C., at atmospheric pressure, so that they evaporate under the conditions of the exothermic polyaddition reaction. Examples of such preferred liquids are alkanes, such as heptane, hexane, n- and isopentane, preferably technical-grade mixtures of n- and isopentanes, n- and isobutane and propane, cycloalkanes, such as cyclopentane and/or cyclohexane, ethers, such as furan, dimethyl ether and diethyl ether, ketones, such as acetone and methyl ethyl ketone, and alkyl carboxylates, such as methyl formate, dimethyl oxalate and ethyl acetate. It is also possible to use mixtures of these low-boiling liquids with one another and/or with other substituted or unsubstituted hydrocarbons. Also suitable are organic carboxylic acids, for example formic acid, acetic acid, oxalic acid, ricinoleic acid and carboxyl-containing compounds.

Preference is given to water, tert-butanol, carboxylic acids, in particular formic acid, low-boiling liquids, such as ethers, esters, ketones and hydrocarbons, in particular n-pentane, isopentane, cyclopentane and 2,2-dimethylpropane.

e) The catalysts (e) used to produce the rigid foams are, in particular, compounds which greatly accelerate the reaction of the compounds of component (b) containing reactive hydrogen atoms, in particular hydroxyl groups and, if used, component (c) with the organic, modified or unmodified polyisocyanates (a). Suitable compounds are organometallic compounds, preferably organotin compounds, such as tin(II) salts of organic carboxylic acids, eg. tin(II) acetate, tin(II) octanoate, tin(II) ethylhexanoate and tin(II) laurate, and dialkyltin(IV) salts of organic carboxylic acids, eg. dibutyltin diacetate, dibutyltin dilaurate, dibutyltin maleate and dioctyltin diacetate. The organometallic compounds can be employed alone or preferably in combination with highly basic amines. Examples which may be mentioned are amidines, such as 2,3-dimethyl-3,4,5,6-tetrahydropyrimidine, tertiary amines, such as triethylamine, tributylamine, dimethylbenzylamine, N-methyl-, N-ethyl-, N-cyclohexylmorpholine, N,N,N',N'-tetramethylethylenediamine, N,N,N',N'-tetramethylbutanediamine, N,N,N',N'-tetramethyl-1,6-hexanediamine, pentamethyldiethylenetriamine, tetramethyldiaminoethyl ether, bis(dimethylaminopropyl) urea, dimethylpiperazine, 1,2-dimethylimidazole, 1-azabicyclo[3.3.0]octane, and, preferably, 1,4-diazabicyclo[2.2.2]octane and alkanolamine compounds such as triethanolamine, triisopropanolamine, N-methyl- and N-ethyldiethanolamine and dimethylethanolamine.

Other suitable catalysts are tris(dialkylaminoalkyl)-s-hexahydrotriazines, in particular tris(N,N-dimethylaminopropyl)-s-hexahydrotriazine, tetraalkylammonium salts, for example N,N,N-trimethyl-N-2-hydroxypropyl formate and N,N,N-trimethyl-N-2-hydroxypropyl 2-ethylhexanoate, tetraalkylammonium hydroxides, such as tetramethylammonium hydroxide, alkali metal hydroxides, such as sodium hydroxide, and alkali metal alkoxides, such as sodium methoxide and potassium isopropoxide, and alkali metal salts of long-chain fatty acids having 4 to 20 carbon atoms and possibly pendant OH groups.

Preference is given to tertiary amines, tin compounds, bismuth compounds, alkali metal and alkaline earth metal carboxylates, quaternary ammonium salts, s-hexahydrotriazines and tris(dialkylaminomethyl)phenols.

Preference is given to from 0.001 to 5% by weight, in particular from 0.05 to 2% by weight, of catalyst or catalyst combination, based on the weight of component (b).

f) The flameproofing agent (f) used in accordance with the invention is a combination of at least one liquid flameproofing agent which is reactive toward isocyanates and at least one solid flameproofing agent.

Suitable liquid flameproofing agents which are reactive toward isocyanates and form a constituent of the novel combination are compounds which contain at least one hydrogen atom which is reactive toward isocyanates and carry one or more reactive groups selected from OH groups, SH groups, NH groups, NH$_2$ groups and CH-acidic groups, for example β-diketo groups, in the molecule and exhibit a flame protection-supporting action. P- and/or N-containing compounds are particularly suitable for this purpose. Examples which may be mentioned are esterification products of phosphoric acid or phosphorous acid with glycols, for example tris(2-hydroxypropyl)phosphate, tris(5-hydroxy-3-oxapentyl)phosphate, tris(5-hydroxy-2,5-dimethyl-3-oxapentyl)phosphate, tris(2-hydroxypropyl) phosphite, tris(5-hydroxy-3-oxapentyl)phosphite, tris(5-hydroxy-2,5-dimethyl-3-oxapentyl)phosphite, pentakis(dipropylene glycol)diphosphate, heptakis(dipropylene glycol)triphosphate, pentakis(dipropylene glycol)diphosphite, heptakis(dipropylene glycol)triphosphite, aminomethylated phosphonic acid esters, for example diethyl N,N-bis(2-hydroxyethyl)aminomethanephosphonate, diethyl N,N-bis(2-hydroxypropyl)aminomethanephosphonate, diisopropyl N,N-bis(2-hydroxypropyl)aminomethanephosphonate, alkoxylation products of phosphoric acid, phosphorous acid, polyphosphoric acids, mono- and dialkyl esters of phosphoric acid, mono- and dialkyl esters of phosphorous acid, where the alkoxylating agent used is preferably ethylene oxide and/or propylene oxide and/or butylene oxide, and from 1 to 20 alkylene oxide units are preferably added on. The liquid flameproofing agent which is reactive toward isocyanates can furthermore be a melamine derivative, for example N,N',N"-tris(2-hydroxyethyl)melamine, N,N',N"-tris(2-hydroxypropyl)melamine or N,N',N"-tris(5-hydroxy-3-oxapentyl)melamine.

A specific example of a urea derivative is N,N'-di(methoxy-2-hydroxyethyl)urea.

Preference is given to aminomethylated phosphonic acid esters, for example diethyl N,N-bis(2-hydroxyethyl) aminomethanephosphonate, diethyl N,N-bis(2-hydroxypropyl)aminomethanephosphonate and diisopropyl N,N-bis(2-hydroxypropyl)aminomethanephosphonate.

The flameproofing agents listed above by way of example can be used individually or as a mixture. Solid, reactive flameproofing agents can be converted into a liquid state by dissolution in liquid flameproofing agents which are reactive toward isocyanates.

Suitable solid flameproofing agents which form a constituent of the novel combination are substances which have a flame protection-supporting or promoting action in the novel combination. Preference is given to pulverulent substances having a particle size of below 0.1 mm, in particular below 0.04 mm. Examples which may be mentioned are ammonium phosphate, diammonium hydrogenphosphate, ammonium dihydrogenphosphate, ammonium polyphosphate, phospham, melamine, melamine cyanurate, melamine phosphate, melamine pyrophosphate, melamine borate, melamine barbiturate, tris(hydroxyethyl)cyanurate, aluminum oxide trihydrate, magnesium hydroxide, graphite, expandable graphite, calcium borate, barium borate, zinc borate, zinc hydroxystannate, natural and modified starches, cellulose, lignin, zeolites, bentonite, guanidine carbonate, guanidine barbiturate, magnesium carbonate, hydromagnesite and huntite. The pulverulent flameproofing agents can also have been modified by means of surface coatings. The abovementioned solid flameproofing agents can be used individually or in the form of a mixture.

The weight ratio between the liquid flameproofing agent which is reactive toward isocyanates and the solid flameproofing agent is from 5:1 to 1:5, preferably from 2:1 to 1:2.

The content of the combination of liquid flameproofing agent which is reactive toward isocyanates and solid flameproofing agent is from 10 to 45% by weight, preferably from 20 to 35% by weight, based on the total weight of the system.

The flameproofing in accordance with the invention of the rigid, isocyanate-based foams is preferably carried out using exclusively the above combination of liquid flameproofing agent which is reactive toward isocyanates and solid flameproofing agent. It is of course also possible to use small amounts of unreactive liquid flameproofing agents.

However, it would be preferred to achieve the same effect by increasing the novel constituents.

Suitable additional flameproofing agents which may be used are unreactive, additive, liquid flameproofing agents, preferably the alkyl, aryl and aralkyl esters of phosphoric acid, of phosphonic acid and of phosphorous acid known per se. Examples which may be mentioned are dimethyl methylphosphonate, diethyl ethylphosphonate, triethyl phosphate, tributyl phosphate, tributoxyethyl phosphate, triphenyl phosphate, diphenyl cresyl phosphate, tricresyl phosphate, resorcinol bisdiphenyl phosphate and triphenyl phosphite.

The content of the additional liquid, unreactive flameproofing agent is at most 3% by weight, based on the total system.

The flameproofing agent combination employed in accordance with the invention is halogen-free.

g) The reaction mixture for the production of the rigid foams may also be admixed with further auxiliaries and/or additives (g). Additives and auxiliaries which may be mentioned are surfactants, foam stabilizers, cell regulators, fillers, dyes, pigments, hydrolysis-protection agents, and fungistatic and bacteriostatic substances.

Examples of suitable surfactants are compounds which serve to support homogenization of the starting materials and may also be suitable for regulating the cell structure of the plastics. Specific examples are emulsifiers, such as the sodium salts of castor oil sulfates, or of fatty acids, and the salts of fatty acids with amines, for example diethylamine oleate, diethanolamine stearate and diethanolamine ricinoleate, salts of sulfonic acids, eg. alkali metal salts or ammonium salts of dodecylbenzene- or dinaphthyl-methanedisulfonic acid and ricinoleic acid; foam stabilizers, in particular those based on silicone, such as siloxane-oxyalkylene copolymers and other organopolysiloxanes, oxyethylated alkylphenols, oxyethylated fatty alcohols, paraffin oils, castor oil esters, ricinoleic acid esters, Turkey red oil and groundnut oil, and cell regulators, such as paraffins, fatty alcohols and dimethylpolysiloxanes. Suitable compounds for improving the emulsification action and the cell structure and/or stabilizing the foam are furthermore the above-described oligomeric acrylates containing polyoxy-alkylene and fluoralkane radicals as side groups. The surfactants are usually used in amounts of from 0.01 to 5 parts by weight, based on 100 parts by weight of component (b).

In addition to the solid flameproofing agents, it is also possible to use fillers causing only a minor improvement in the fire behavior, or none at all.

For the purposes of the present invention, fillers, in particular reinforcing fillers, are conventional organic and inorganic fillers, reinforcing agents, etc. known per se. Specific examples are inorganic fillers, such as silicate minerals, for example phyllosilicates, such as antigorite, serpentine, hornblends, amphiboles, chrysotile, talc; metal oxides, such as kaolin, aluminum oxides, titanium oxides and iron oxides, metal salts, such as chalk, barytes and inorganic pigments, such as cadmium sulfide, zinc sulfide and glass, inter alia. Preference is given to kaolin (china clay), aluminum silicate and coprecipitates of barium sulfate and aluminum silicate, and natural and synthetic fibrous minerals, such as wollastonite, metal fibers and in particular glass fibers of various lengths, if desired sized. Examples of suitable organic fillers are carbon, melamine, collophony, cyclopentadienyl resins and graft polymers, and also cellulose fibers, polyamide fibers, polyacrylonitrile fibers, polyurethane fibers and polyester fibers based on aromatic and/or aliphatic dicarboxylic esters and in particular carbon fibers.

The inorganic and organic fillers may be used individually or as mixtures and are advantageously introduced into the reaction mixture in amounts of from 0.5 to 30% by weight, preferably from 1 to 15% by weight, based on the weight of components (a) to (c), but the content of mats and nonwoven and woven fabrics made from natural or synthetic fibers can achieve values of up to 80.

Further details on these and other starting materials can be obtained from the specialist literature, for example from the monograph by J. H. Saunders and K. C. Frisch in High Polymers, Volume XVI, Polyurethanes, Parts 1 and 2, Interscience Publishers 1962 and 1964 respectively, or Kunststoff-Handbuch, Polyurethane, Volume VII, Carl-Hanser-Verlag, Munich, Vienna, 1st, 2nd and 3rd Editions, 1966, 1983 and 1993 respectively.

In order to produce the rigid, isocyanate-based foams, the organic and/or modified organic polyisocyanates (a), the relatively high-molecular-weight compounds containing at least two reactive hydrogen atoms (b) and, if used, chain extenders and/or crosslinking agents (c) are reacted in such amounts that the ratio between the number of equivalents of NCO groups in the polyisocyanates (a) and the total number of reactive hydrogen atoms in components (b) and, if used, (c) is from 0.85 to 1.25:1, preferably from 0.95 to 1.15:1, in particular from 1 to 1.05:1. If the rigid foams contain at least some bonded isocyanurate groups, the ratio between the NCO groups in the polyisocyanates (a) and the total number of reactive hydrogen atoms in component (b) and, if used, (c) is usually from 1.5 to 60:1, preferably from 1.5 to 8:1.

The rigid, isocyanate-based foams are advantageously produced by the one-shot process, for example with the aid of the high-pressure or low-pressure method in open or closed molds, for example metallic molds. It has proven particularly advantageous to use the two-component process and to combine formative components (b), (d), (e), (f) and, if used, (c) and (g) in component (A) and to use the organic and/or modified polyisocyanates (a) or mixtures of said polyisocyanates and, if desired, blowing agents (d) as component (B).

The solid flameproofing agents and any further fillers can be mixed directly with the other constituents of the formulation. However, it is preferred to premix the solid flameproofing agents and any further fillers with liquid constituents of the formulation using suitable equipment, in particular stirrers, dispersers or mixers. It is particularly preferred to premix the solid constituents of the formulation with some or all of component A.

The starting components are mixed at from 15 to 90° C., preferably at from 20 to 60° C., in particular at from 20 to 35° C., and are introduced into the open or, if desired under superatmospheric pressure, into the closed mold.

In closed molds, it is also possible to use a greater amount of foam-forming reaction mixture than is necessary for complete filling of the mold. In this case, compacted foams are obtained. A preferred variant of the foam production is twin conveyor belt technology.

The rigid foams or molded foams produced by the novel process have a density of from 0.02 to 0.75 g/cm$^3$, preferably from 0.025 to 0.24 g/cm$^3$, in particular from 0.03 to 0.1 g/cm$^3$. They are particularly suitable as insulating materials in the construction industry and in the refrigeration sector, for example as the core layer for sandwich elements or for foam-filling refrigerator and freezer casings.

The invention is described in greater detail in the working examples below.

EXAMPLE 1

A mixture of 38.1 parts by weight of polyether alcohol based on sucrose/propylene oxide, OH number 400 mg of KOH/g, 25.0 parts by weight of diethyl N,N-bis(2-hydroxyethyl) aminomethanephosphonate, 1.5 parts by weight of water, 2.0 parts by weight of silicone foam stabilizer, B 8466 from Goldschmidt, 1.4 parts by weight of N,N,N',N'-tetramethylhexamethylenediamine, 24.0 parts by weight of ammonium polyphosphate and 8.0 parts by weight of natural mineral mixture comprising huntite and hydromagnesite, was mixed with 5.0 parts by weight of n-pentane and 90.0 parts by weight of MDI crude product, NCO content 31.5%.

The foam formed had the following properties:

Curing: good, shrinkage-free Construction material class in accordance with DIN 4102: B2 Flame height: 11.1 cm

EXAMPLE 2

A mixture of 34.1 parts by weight of polyether alcohol based on sucrose/propylene oxide, OH number 400 mg of KOH/g, 25.0 parts by weight of diethyl N,N-bis(2-hydroxypropyl)aminomethanephosphonate, 1.5 parts by weight of water, 2.0 parts by weight of silicone foam stabilizer, B 8466 from Goldschmidt, 1.4 parts by weight of N,N,N',N'-tetramethylhexamethylenediamine, 27.0 parts by weight of ammonium polyphosphate and 9.0 parts by weight of natural mineral mixture comprising huntite and hydromagnesite, was mixed with 5.0 parts by weight of n-pentane and 82.0 parts by weight of MDI crude product, NCO content 31.5%.

The foam formed had the following properties:
Curing: good, shrinkage-free Construction material class in accordance with DIN 4102: B2 Flame height: 12.6 cm

EXAMPLE 3

A mixture of 38.1 parts by weight of polyether alcohol based on sucrose/propylene oxide, OH number 400 mg of KOH/g, 15.0 parts by weight of diethyl N,N-bis(2-hydroxyethyl)aminomethanephosphonate, 25.0 parts by weight of propoxylated phosphoric acid, OH number 450 mg of KOH/g, 1.5 parts by weight of water, 2.0 parts by weight of silicone foam stabilizer, B 8466 from Goldschmidt, 1.4 parts by weight of N,N,N',N'-tetramethylhexamethylenediamine, 24.0 parts by weight of ammonium polyphosphate and 8.0 parts by weight of natural mineral mixture comprising huntite and hydromagnesite, was mixed with 5.0 parts by weight of n-pentane and 90.0 parts by weight of MDI crude product, NCO content 31.5%.

The foam formed had the following properties:
Curing: good, shrinkage-free Construction material class in accordance with DIN 4102: B2 Flame height: 12.4 cm

EXAMPLE 4

A mixture of 25.2 parts by weight of polyether alcohol based on sucrose/propylene oxide, OH number 400 mg of KOH/g, 25.0 parts by weight of diethyl N,N-bis(2-hydroxyethyl)aminomethanephosphonate, 4.2 parts by weight of glycerol, 1.5 parts by weight of water, 1.5 parts by weight of silicone foam stabilizer, B 8466 from Goldschmidt, 1.6 parts by weight of N,N,N',N'-tetramethylhexamethylenediamine, 2.0 parts by weight of potassium acetate (50%) in ethylene glycol and 39.0 parts by weight of diammonium hydrogenphosphate was mixed with 6.5 parts by weight of n-pentane and 110.0 parts by weight of MDI crude product, NCO content 31.5%.

The foam formed had the following properties:
Curing: good, shrinkage-free Construction material class in accordance with DIN 4102: B2 Flame height: 10.3 cm

EXAMPLE 5

A mixture of 35.0 parts by weight of polyether alcohol based on sucrose/propylene oxide, OH number 400 mg of KOH/g, 25.0 parts by weight of diethyl N,N-bis(2-hydroxyethyl)aminomethanephosphonate, 0.9 part by weight of water, 2.0 parts by weight of silicone foam stabilizer, B 8466 from Goldschmidt, 1.1 parts by weight of N,N,N',N'-tetramethylhexamethylenediamine, 27.0 parts by weight of ammonium polyphosphate and 9.0 parts by weight of barium borate as mixed with 6.0 parts by weight of n-pentane and 80.0 parts by weight of MDI crude product, NCO content 31.5%.

The foam formed had the following properties:
Curing: good, shrinkage-free Construction material class in accordance with DIN 4102: B2 Flame height: 10.1 cm

EXAMPLE 6

A mixture of 35.0 parts by weight of polyether alcohol based on sucrose/propylene oxide, OH number 400 mg of KOH/g, 25.0 parts by weight of diethyl N,N-bis(2-hydroxyethyl)aminomethanephosphonate, 0.9 part by weight of water, 2.0 parts by weight of silicone foam stabilizer, B 8466 from Goldschmidt, 1.1 parts by weight of N,N,N',N'-tetramethylhexamethylenediamine, 18.0 parts by weight of melamine cyanurate, 8.0 parts by weight of tris(hydroxyethyl)cyanurate and 10.0 parts by weight of ammonium polyphosphate was mixed with 6.0 parts by weight of n-pentane and 80.0 parts by weight of MDI crude product, NCO content 31.5%.

The foam formed had the following properties:
Curing: good, shrinkage-free Construction material class in accordance with DIN 4102: B2 Flame height: 11.3 cm

EXAMPLE 7

A mixture of 38.3 parts by weight of polyether alcohol based on sucrose/propylene oxide, OH number 400 mg of KOH/g, 22.5 parts by weight of diethyl N,N-bis(2-hydroxyethyl)aminomethanephosphonate, 2.5 parts by weight of triethyl phosphate, 0.3 part by weight of water, 2.0 parts by weight of silicone foam stabilizer, B 8466 from Goldschmidt, 1.4 parts by weight of N,N,N',N'-tetramethylhexamethylenediamine, 22.0 parts by weight of ammonium polyphosphate and 11.0 parts by weight of wheat starch was mixed with 5.0 parts by weight of cyclopentane and 90.0 parts by weight of MDI crude product, NCO content 31.5%.

The foam formed had the following properties:
Curing: good, shrinkage-free Construction material class in accordance with DIN 4102: B2 Flame height: 12.8 cm

EXAMPLE 8

A mixture of 38.3 parts by weight of polyether alcohol based on sucrose/propylene oxide, OH number 400 mg of KOH/g, 12.5 parts by weight of diethyl N,N-bis(2-hydroxyethyl)aminomethanephosphonate, 10.0 parts by weight of N,N',N"-tris(2-hydroxypropyl)melamine, 2.5 parts by weight of triethyl phosphate, 0.3 part by weight of water, 2.0 parts by weight of silicone foam stabilizer, B 8466 from Goldschmidt, 1.4 parts by weight of N,N,N',N'-tetramethylhexamethylenediamine, 22.0 parts by weight of ammonium polyphosphate and 11.0 parts by weight of wheat starch was mixed with 5.0 parts by weight of cyclopentane and 90.0 parts by weight of MDI crude product, NCO content 31.5%.

The foam formed had the following properties:
Curing: good, shrinkage-free Construction material class in accordance with DIN 4102: B2 Flame height: 13.2 cm

EXAMPLE 9

A mixture of 38.3 parts by weight of polyether alcohol based on sucrose/propylene oxide, OH number 400 mg of KOH/g, 22.5 parts by weight of diethyl N,N-bis(2-hydroxyethyl)aminomethanephosphonate, 2.5 parts by weight of diethyl ethylphosphonate, 0.3 part by weight of water, 2.0 parts by weight of silicone foam stabilizer, B 8466 from Goldschmidt, 1.4 parts by weight of N,N,N',N'-tetramethylhexamethylenediamine, 22.0 parts by weight of ammonium polyphosphate and 11.0 parts by weight of wheat starch was mixed with 5.0 parts by weight of cyclopentane and 90.0 parts by weight of MDI crude product, NCO content 31.5%.

The foam formed had the following properties:
Curing: good, shrinkage-free Construction material class in accordance with DIN 4102: B2 Flame height: 11.9 cm

EXAMPLE 10 (Comparison)

A mixture of 48.3 parts by weight of polyether alcohol based on sucrose/propylene oxide, OH number 400 mg of KOH/g, 5.6 parts by weight of glycerol, 9.4 parts by weight of diethyl ethylphosphonate, 0.3 part by weight of water, 2.0 parts by weight of silicone foam stabilizer, B 8466 from Goldschmidt, 1.4 parts by weight of N,N,N',N'-tetramethylhexamethylenediamine, 22.0 parts by weight of ammonium polyphosphate and 11.0 parts by weight of wheat starch was mixed with 5.0 parts by weight of cyclopentane and 90.0 parts by weight of MDI crude product, NCO content 31.5%.

The foam formed the following properties:
Curing: retarded, shrinks slightly Construction material class in accordance with DIN 4102: B3 Flame height: 17.9 cm

EXAMPLE 11 (Comparison)

A mixture of 56.5 parts by weight of polyether alcohol based on sucrose/propylene oxide, OH number 400 mg of KOH/g, 27.5 parts by weight of diethyl N,N-bis(2-hydroxyethyl)aminomethanephosphonate, 10.0 parts by weight of diethyl ethylphosphonate, 2.0 parts by weight of water, 2.0 parts by weight of silicone foam stabilizer, B 8466 from Goldschmidt, and 2.0 parts by weight of N,N,N',N'-tetramethylhexamethylenediamine, was mixed with 6.0 parts by weight of cyclopentane and 120.0 parts by weight of MDI crude product, NCO content 31.5%.

The foam formed had the following properties:
Curing: good, shrinkage-free Construction material class in accordance with DIN 4102: B3 Flame height:>19 cm

We claim:

1. A process for the production of flameproofed, rigid, isocyanate-based foams, comprising reacting:
    a) organic and/or modified organic polyisocyanates with
    b) a compound containing at least two reactive hydrogen atoms, having a number average molecular weight of from 400 to 8000 and, optionally,
    c) chain extenders and/or crosslinking agents having a number average molecular weight of less than 400, in the presence of
    d) blowing agents,
    e) catalysts,
    f) flameproofing agents, and, optionally,
    g) further auxiliaries and/or additives,
wherein the flameproofing agent comprises a liquid flameproofing agent which is reactive toward isocyanates and a solid flameproofing agent selected from the group consisting of ammonium phosphate, diammonium hydrogen phosphate, ammonium dihydrogenphosphate and mixtures thereof, and wherein said liquid flameproofing agent is exclusive of components b) and c).

2. A process as claimed in claim 1, wherein the liquid flameproofing agent which is reactive toward isocyanates is a compound having at least one hydrogen atom which is reactive toward isocyanates which is selected from the group consisting of OH groups, SH groups, NH groups, $NH_2$ groups and CH-acidic groups.

3. A process as claimed in claim 1, wherein the liquid flameproofing agent which is reactive toward isocyanates is a phosphorus and/or nitrogen compound.

4. A process as claimed in claim 1, wherein the liquid flameproofing agent which is reactive toward isocyanates is an aminomethylated phosphonic acid ester.

5. A process as claimed in claim 1, wherein an unreactive liquid flameproofing agent is used in addition to the combination of liquid flameproofing agent which is reactive toward isocyanates and solid flameproofing agent.

6. A process as claimed in claim 5, wherein the content of the unreactive liquid flameproofing agent is at most 3% by weight, based on the total weight of the foam.

7. A process as claimed in claim 1, wherein the flameproofing agent combination is halogen-free.

8. A process as claimed in claim 2, wherein liquid flameproofing agent which is reactive toward isocyanates is a phosphorus and/or nitrogen compound.

9. A process as claimed in claim 8, wherein the liquid flameproofing agent which is reactive toward isocyanates is an amino methylated phosphonic acid ester.

10. A process as claimed in claim 9, wherein the weight ratio between the liquid flameproofing agent which is reactive toward isocyanates and the solid flameproofing agent is from 5:1 to 1:5.

11. A process as claimed in claim 10, wherein the content of the combination of liquid flameproofing agent which is reactive toward isocyanates and solid flameproofing agent is from 10 to 45 percent by weight, based on the total system.

12. A process as claimed in claim 11, wherein an unreactive liquid flameproofing agent is used in addition to the combination of liquid flameproofing agent which is reactive toward isocyanates and solid flameproofing agent.

13. A process as claimed in claim 12, wherein the content of the additional liquid, unreactive flameproofing agent is at the most three percent by weight, based on the total system.

14. A process as claimed in claim 13, wherein the flameproofing agent combination is halogen-free.

15. A process as claimed in claim 1, wherein the weight ratio of liquid flameproofing agent to solid flameproofing agent is from 5:1 to 1:5.

16. A process as claimed in claim 15, wherein the total amount of liquid flameproofing agent and solid flameproofing agent in the foam is from 10 to 45% by weight based on the total weight of the foam.

* * * * *